(12) United States Patent
Dekoning et al.

(10) Patent No.: US 7,363,457 B1
(45) Date of Patent: Apr. 22, 2008

(54) METHOD AND SYSTEM FOR PROVIDING VIRTUALIZATION DATA SERVICES FOR LEGACY STORAGE DEVICES

(75) Inventors: Rodney A. Dekoning, Wichita, KS (US); David A. Kopper, Wichita, KS (US); Joseph Blount, El Dorado, KS (US); Ronald D. Proulx, Burlington, MA (US); Mark S. Vetter, Holden, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 209 days.

(21) Appl. No.: 11/186,226

(22) Filed: Jul. 21, 2005

(51) Int. Cl.
*G06F 12/00* (2006.01)
(52) U.S. Cl. .................... 711/170; 711/6; 711/112; 711/114; 711/203
(58) Field of Classification Search ............ 711/170, 711/203, 6, 112, 114
See application file for complete search history.

(56) References Cited

U.S. PATENT DOCUMENTS

| | | | |
|---|---|---|---|
| 6,496,914 B1 * | 12/2002 | Sonner et al. ............ 711/170 |
| 6,640,278 B1 * | 10/2003 | Nolan et al. ................ 711/6 |
| 6,845,403 B2 | 1/2005 | Chadalapaka |
| 6,857,059 B2 | 2/2005 | Karpoff et al. |
| 6,877,011 B2 | 4/2005 | Jaskiewicz |
| 6,898,670 B2 | 5/2005 | Nahum |
| 2002/0156987 A1 * | 10/2002 | Gajjar et al. ............ 711/203 |
| 2003/0055972 A1 | 3/2003 | Fuller et al. |
| 2003/0061497 A1 | 3/2003 | Zimmer |
| 2003/0069886 A1 | 4/2003 | Jaskiewicz |
| 2003/0084209 A1 | 5/2003 | Chadalapaka |
| 2003/0097611 A1 | 5/2003 | Dalancy et al. |
| 2003/0236945 A1 | 12/2003 | Nashum |
| 2004/0030822 A1 | 2/2004 | Rajan et al. |
| 2004/0117369 A1 | 6/2004 | Mandel et al. |
| 2004/0205143 A1 | 10/2004 | Uemura |
| 2004/0225719 A1 | 11/2004 | Kisley et al. |
| 2005/0005033 A1 | 1/2005 | Powell et al. |
| 2005/0005044 A1 | 1/2005 | Liu et al. |
| 2005/0005062 A1 | 1/2005 | Liu et al. |
| 2005/0015545 A1 | 1/2005 | Liu et al. |
| 2005/0125593 A1 | 6/2005 | Karpoff et al. |
| 2005/0128048 A1 * | 6/2005 | Krzyzanowski et al. ... 340/3.71 |

* cited by examiner

*Primary Examiner*—Stephen Elmore
(74) *Attorney, Agent, or Firm*—Michael C. Martensen; Kent A. Lembke; Hogan & Hartson LLP

(57) ABSTRACT

A method, and associated system, for delivering data services such as virtualization to legacy devices. The method involves reserving a metadata region in memory of a storage resource in a storage pool that is controlled by (or is captive to) a data services platform. The metadata region includes a global set containing information used by the data services platform to manage the data services, including virtualization of volumes throughout the storage pool. The method includes locating an available legacy storage device and retrieving element information for the legacy storage device. A volume or virtualized legacy volume is built based on the collected element information, and the global set in the metadata region is update to include volume information for the legacy storage device. The legacy storage device includes memory that stores legacy or user data, but the steps of the method are performed to leave the legacy data unchanged.

17 Claims, 8 Drawing Sheets

METHOD AND SYSTEM FOR PROVIDING VIRTUALIZATION DATA SERVICES FOR LEGACY STORAGE DEVICES

BACKGROUND OF THE INVENTION

1. Field of the Invention

The present invention relates, in general, to data storage devices and their management including virtualization of the devices, and, more particularly, to a method and corresponding system for providing virtualization data services in a data storage system that includes legacy storage devices with data in place or without disrupting user data on such devices.

2. Relevant Background

An ongoing challenge facing designers and developers of data storage systems is how best to use and integrate existing legacy storage devices with other data storage devices. A legacy storage device is a data storage device that already contains user or application data because it has been used for data storage in the past, such as a host device running an application or as part of an enterprise's data storage system. Problems arise later when attempts are made to include the legacy device in a larger data storage system that includes a variety of management services.

For example, many data storage systems are managed or configured to provide virtualization features. Virtualization allows a set of storage devices to be pooled together with the combined storage space being regarded as addressable main storage by a user of a data storage system into which virtual addresses are mapped. Presently, when a user allows a data storage system access to a legacy storage device by mapping it to a host or storage manager, the legacy storage device does not support a variety of virtualization features such as volume expansion, snapshot, mirroring, and data migration. Placing metadata or information needed to support these virtualization features on the legacy storage device would destroy the user data stored on the device. As a result, it has proven difficult to fully utilized legacy storage devices that are added to a data storage system with the added devices typically not supporting virtualization and appearing as uninitialized devices or disks to a storage processor.

In some data storage applications, a storage system may include a "virtualization head" and a set of "captive" storage devices. The storage devices are captive in that they are initially considered raw storage that can be provisioned by the virtualization head. Part of such provisioning that is done by the virtualization head involves the reservation of a configuration metadata region that maintains logs, configuration information, and the like for each storage device in the system, and the data stored in this region on each device facilitates and supports virtualization throughout the raw storage devices. A problem arises because the virtualization head cannot store its configuration metadata region on a legacy device or volume without destroying previously stored user data.

Another problem is that the data services provided by a data storage manager or processor often require a logging region, a data service-specific metadata region, and a scratch pad region to effectively carry out data management functions. As with the configuration metadata regions, the data storage manager or processor cannot store these regions or their corresponding data on the legacy device without copying over existing user data on a legacy device. The lack of this data seriously affects the use and integration of legacy storage devices into data storage systems, which often results in the legacy storage devices not being effectively utilized and their storage capacities being unavailable to all users of the data storage system.

Hence, there remains a need for a method and system for more effectively integrating legacy storage devices into data storage systems to enable their pooling with other raw storage devices. Such a method and system preferably would be configured to support at least a portion of the virtualization features presently not available with legacy storage devices such as volume expansion, snapshot, mirroring, data migration, and/or other useful virtualization features.

SUMMARY OF THE INVENTION

The present invention addresses the above and other problems by providing a method and corresponding systems for providing data services including virtualization to legacy storage devices that are added or made available in a storage pool of captive devices. The methods and systems of the invention are adapted to enable generation and management of virtualized volumes for legacy device without destroying user or legacy data stored on the legacy device.

More particularly, a method is provided for delivering data services such as virtualization to legacy storage devices. The method involves reserving a configuration metadata region (or MDR) in memory of a storage resource that is provided in a storage pool and that is controlled by (or is captive to) a data services platform or storage controller, i.e., an MDR is provided on all captive storage devices. The MDR includes a global set of data containing information used by the data services platform to manage or provide the data services, including virtualization of volumes throughout the storage pool. The method continues with locating a legacy storage device available for use or inclusion in the storage pool, and then, retrieving element information for the legacy storage device from the MDR on the captive storage device(s). A volume (or virtualized legacy volume (VLV)) is built based on the collected element information. The method then includes updating the global set of data in the MDR to include information on the volume built using the legacy storage device element information. The legacy storage device includes memory that stores legacy or user data, but the steps of the method are performed to leave the legacy data unchanged, with volume information stored in the global set of the MDR.

In some embodiments of the invention, the element information collected for the legacy device may include extent and disk information for the legacy device. The building of the VLV may include building a volume tree and marking the volume tree as a VLV (or flagging the tree) to allow the VLV to be treated differently from other volumes in the storage pool by the data services platform (e.g., no MDR is provided on the legacy device). The method may further include providing a snapshot storage device for the built VLV including updating a metadata region of the snapshot device based on the volume information for the legacy storage device.

DETAILED DESCRIPTION OF THE PREFERRED EMBODIMENTS

Figure 1:
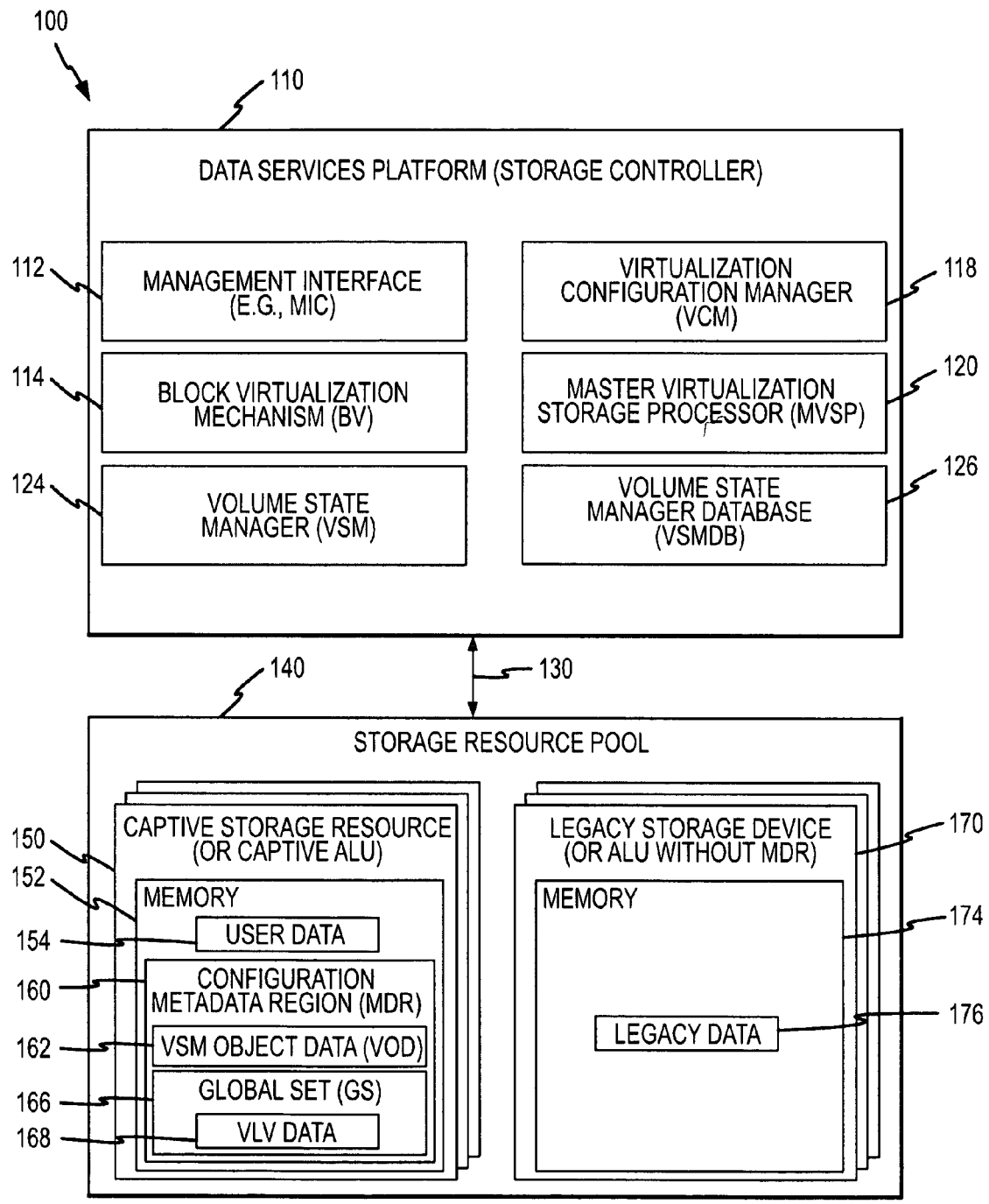
FIG. 1 illustrates in block form a data storage system according to one embodiment of the present invention showing a data services platform or storage controller configured to provide the data services functions of the invention to legacy storage devices.

The invention is generally directed to providing a method and system for providing data services such as virtualization to legacy storage devices that contains user or legacy data that is not affected in providing the data services. The inventive method and system provides a data storage system with a data services platform (or storage controller) that manages a storage resource pool of captive storage resources and legacy storage devices. The legacy storage devices are accessible, such as by mapping to a host, but do not as initially provided to the storage resource pool support data services, such as virtualization, controlled by the data services platform because the legacy storage devices do not store or contain metadata used by the data service platform for providing such services to the captive storage resources. According to the invention, the data services platform reserves a configuration metadata region on each of the captive storage resources that contains the definition of the storage system's virtualized storage devices along with the state information for both logical and physical devices (e.g., 128 MB for each device that is extensible using a page reference scheme). A portion of the configuration metadata region provides a global set of definitions for the data storage system (i.e., the global set), and this region is mirrored across at least a subset of the captive storage resources for redundancy.

The following description describes the method and system of the invention for providing enhanced data services for added legacy storage devices in part by storing configuration metadata for the legacy storage devices in the global set of the data storage system (e.g., stored in the global subset of captive storage resources in each of their global set region of the configuration metadata region of memory). The data services platform or storage controller of the invention includes logic or software (e.g., the platform's configuration management code) is written or adapted to affect the discovery of legacy volumes (or legacy storage devices) such as physically through its driver stacks and/or logically via a scan of the global set configuration metadata region. As will become clear from the following description, the data services platform is also designed to enable the placement of data service specific data regions, logging regions, and scratch pad regions useful for managing the legacy devices on devices other than the legacy device being "virtualized" through the data services platform. To support virtualization and other data services, a virtualized legacy volume (VLV) is created for each legacy storage device in the storage resource pool, and the VLV is a volume that supports data services whose metadata resides on a device other than the legacy device (i.e., in a global set region of a configuration metadata region of a captive storage resource. Significantly, according to the invention, data services are provided to the legacy storage devices via the data service platform and the use of configuration metadata regions in a global set of captive storage resources while leaving the legacy or user data intact on the legacy storage devices and without requiring the user or legacy data to be copied to a virtualized volume.

In the following discussion, computer and network devices (or "elements"), such as the software and hardware devices within the system 100, are described in relation to their function rather than as being limited to particular electronic devices and computer architectures and programming languages. To practice the invention, the computer and network devices or elements may be any devices useful for providing the described functions, including well-known data processing and communication devices and systems, such as application, database, Web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network.

Similarly, data storage systems and memory components are described herein generally and are intended to refer to nearly any device and media useful for storing digital data such as disk-based devices, their controllers or control systems, and any associated software. Data, including transmissions to and from the elements of the network 100 and among other components of the network/systems 100, such as between services, typically is communicated in digital format following standard communication and transfer protocols, such as TCP/IP, HTTP, HTTPS, FTP, SCSI, iSCSI, FC, iFC, and the like, or IP or non-IP wireless communication protocols, such as a FC storage system linked via an Ethernet. The invention is particularly suited for use with enterprise storage systems such as those serviced by storage arrays managed by a storage controller and including a plurality of data storage devices or arrays (e.g., disk devices and the like). For example, but not as a limitation, the invention and its features may readily be implemented in a data services platform (DSP) or storage controller, such as the DSP provided in the Sun Microsystems, Inc. StorEdge™ 6920 product or similar products, and an associated storage resource pool including captive or assigned storage devices and one or more added legacy storage device. However, the concepts of the invention are readily applicable to many other storage systems that utilize a storage controller to manage data services such as virtualization in a pool of storage resources or devices such as standard disk arrays.

FIG. 1 illustrates one embodiment of a data storage system 100 according to the invention. As shown, the system 100 includes a data services platform (or storage controller) 110 that is linked (such as via FC protocol or Ethernet) via digital data communications link 130 to a storage resource pool 140. The storage resource pool 140 may take a number of forms and may be provided in a single array cabinet or in a plurality of cabinets and other devices containing a variety of heterogeneous storage devices or relatively homogeneous storage devices. The storage resource pool 140 includes one or more captive storage resources 150 that may be considered an attached logical unit (ALU) representing a physical device and/or a logical device represented by an identification number or logical unit number (LUN) given to devices connected to a SCSI adapter. Each captive storage resource 150 includes memory 152 storing data 154 and also, significantly, including a configuration metadata region (MDR) 160. Typically, the MDR 160 is allocated and created when a device is configured as "captive."

The MDR 160 is an area in memory 152 on each captive ALU that contains information (such as volume and global set information) used by the data services platform 110 to provide data services including virtualization in the storage resource pool 140, e.g., for the captive storage resources 150 and for the legacy storage devices 170. To this end, the MDR 160 is shown to include volume state manager (VSM) object data 162, e.g., partition, parent volume, and other information, and a global set (GS) data 166 including virtualized legacy volume (VLV) data 168. The GS data 166 is an area of the MDR 160 that is global across the pool 140 managed by the data services platform 110. Unlike the VOD 162 which contains information specific to the ALU 150 on which it resides, the GS 166 contains chassis wide information. For example, the specific information in the VOD 162 may include a definition of ALU usage of virtual volume and state and configuration information for those virtual volumes associated with the ALU. The GS data 166 is replicated across a set of the captive storage resources 150 (i.e., a global set of the ALUs 150 with the global set being a subset of the ALUs 150 chosen for redundancy), and the GS data 166 contains VLV data 168. The VLV data 168 represents or defines a virtualized volume with a primary component is a device or ALU without volume and other information used by the data services platform 110 to provide virtualization and other data services.

Specifically, the storage resource pool 140 is shown to include one or more (such as more than 2 for redundancy purposes) legacy storage devices 170 which are ALUs that do not have a configuration metadata region as provided for the captive resources 150. Each legacy device 170 includes memory 174 with legacy data or user data 176 that remains intact although the device 170 may be virtualized by the data services platform 110. The legacy storage device 170 may be considered a direct access volume (DAV), which is a physical LUN (e.g., an ALU) that does not contain the MDR 160 and that contains data 176 in memory 174 that is mapped to one or more hosts (not shown). To practice the invention, the GS 166 in the MDR 160 of captive storage resource 150 is shown to include the VLV data 168 for legacy storage device 170, and the VLV data 168 may include the DAV information. The provision of the VLV data 168 in the GS 166 on the captive device 150 enables the data services platform 110 to provide virtualization and/or other data services to the legacy storage device 170 by providing a location for persistent storage of state and configuration of the VLV and data services provided for the VLV.

The techniques for creating and managing a VLV are discussed in detail below with reference to FIGS. 2-8. The VLVs created for the legacy devices 170 can then be accessed through the platform 110 by devices using the storage resource pool 140 for data storage. In addition to virtualization, the platform 110 can provide data service functions such as remote replication and data mirroring that can be applied to these VLVs while preserving the legacy data 176. A user of the system 100 can use the platform 110 for centralized remote replication or for migration on the attached legacy storage device(s) 170 (such as an external device) to add addition capacity to a pool 140.

The data services platform or storage controller 110 includes a number of functional components that work in conjunction to provide data services to the legacy storage devices 170 (and captive storage resources 150). As shown, the data services platform 110 includes one or more management interfaces 112, which may be implemented with one or more management interface cards (MIC) in some embodiments. The management interface 112 typically includes embedded software that controls the boot of the platform 110 and interacts with the external processors, such as device management software on storage service processors (not shown), that interact with the platform 110. The platform 110 includes a block virtualization mechanism (BV) 114 that controls building or generating new volumes in the system 100 including building new VLVs for legacy storage devices 170. A virtualization configuration manager (VCM) 118 is provided to control changes to the volumes in the system 110. A master virtualization storage processor (MVSP) 120 is provided to function as an interface between a volume state manager database (VSMDB) 126 and ALU information, among other functions. Additionally, the data services functions of the platform or DSP 110 is provided by a volume state manager (VSM) 124 that acts to manage state information for the volume or devices 150, 170 in the storage resource pool 140.

The operation of each of the components of DSP 110 are explained in detail with reference to FIGS. 2-8, but prior to this discussion, a number of the architectural specifications of one implementation of the invention are provided to better assist one skilled in the art in fully understanding the benefits of the invention. The DSP 110 may be set up to support a particular number of ALUs, such as for example 128 ALUs, that can be designated as VLVs. Each of these VLVs preferably supports (and hence, the VLV data 168 includes any relevant data) the following virtualization features: (a) any volume type using the VLV allows one or more PIT images to be created against them, such as, for example, 8 PITs; (b) data migration with the DSP 110 allowing the data on a VLV to be migrated to a virtual volume that is managed by the DSP 110; (c) local mirroring with the DSP 110 allowing a VLV to be defined as any component of a mirror volume (including mirroring from a VLV to another VLV); (d) mirroring a VLV for an internal volume; (e) multi-path management abstraction with the DSP 110 presenting a VLV as a symmetric volume to host ports (see, for example, FIG. 8); and (f) persistent reservation reserve commands supported by the VLVs.

In one specific exemplary, but not limiting, embodiment, the VLV data area 168 is a 16 MB area of the 128 MB MDR 160, which is used to store VLV and DAV objects. In this example, this allows for a total of 4096 objects to be contained in the VLV region 168. The number of VLVs supported varies based on how many partitions each VLV contains, but a minimum of 128 VLVs can be supported in this example with the maximum number of partitions in each VLV since the VLV region 168 is mirrored across the global set (or GS subset) of captive storage resources 150.

The DSP 110 is configured to not write any non-host write data to the ALUs 170 designated as VLV. In other words, metadata regions 160 are not written to the legacy storage devices 170, which are designated as VLVs rather than volumes as are captive storage resources 150. The VLVs among the legacy storage devices 170 do not support extension or stripping data service features. One reason why extension is not supported is that once the VLV is extended the legacy device 170 may contain references to data on other partitions and if the legacy device 170 is removed from the VLV the data may be unusable. The configuration information for VLVs is preferably redundantly stored on storage (such as devices 150) managed by the DSP 110 in the MDR GS. The VLVs preferably support reservations and persistent reservations but are not configured for adoption (e.g., to allow a take-ownership command).

In some embodiments of the storage system 100, the only type of volume that may be used for VLV creation is concatenated. Typically, there is at least one initialized captive storage resource 150 with a MDR 160 in the storage resource pool 140 (or 2 captive ALUs 150 if redundancy is desired) before a legacy storage device 170 is added as a VLV. If dynamic COW expansion is supported in the system 100, the COW data and log resides on one or more of the captive ALUs 150 since the DSP 110 cannot write to the legacy device 170 (e.g., to a MDR on such as device 170). Persistent reservation metadata information is stored in the VSMDB 126. A legacy device 170 that is part of a VLV as indicated in VLV data 168 cannot be re-used for another volume or DAV. Further, it is preferable in most embodiments of the storage system 100 that a host (not shown) is not allowed to access the legacy devices 170 directly after they are added to a VLV.

As can be seen from the above description of FIG. 1, a significant change to support VLVs in a storage system is the effective handling of non-captive or non-DSP owned ALUs (i.e., ALUs without a MDR). It is preferable that this challenge be approached such that these ALUs or legacy devices are treated as any other ALU in the storage pool operated by a DSP. In a typical existing storage controller, raw devices such as legacy devices are ignored by the storage controller, e.g., by the VCM and MVSP. For example, when a DAV is added to a target service, the MIC may configure the proper iSCSI connections and set up proper mappings. In contrast for VLVs, the inventors recognize that it will be desirable for the VCM (such as VCM 118 of FIG. 1) to treat raw or legacy devices similar to DSP-owned or captive devices 150 and notify the MVSP 120 when there is a change to any legacy device. In some embodiments, this handled by having the VCM 118 create iSCSI or other communication connections between storage processors (SPs) that contain or control raw or legacy devices. This allows the MVSP 120 to treat the legacy devices as any other ALU (but also has the disadvantage of creating connections for devices the MVSP 120 may not need to access). In more preferred embodiments, the MVSP 120 is configured to recognize when a volume being created is a VLV or at start of day when the VSMDB 126 states there are VLVs. The MVSP 120 requests a list of all non-DSP or non-captive devices (i.e., legacy devices 170) from the VCM 118. The MVSP 120 then adds these devices 170 to its in-memory ALU list. The DSP is typically not allowed to write to any device it discovers that does not have an MDR on it that the DSP recognizes as "its own" until configured to do so by an administrator.

Another issue with handling of legacy devices 170 that is addressed by the invention is what should the MIC 112 (or user) see once a raw or legacy device 170 is added to a VLV. In some embodiments, a processor where the legacy device 170 is attached would detect that the ALU 170 was being used for a VLV and would report a "fake" slice in response to the disk query. In more preferred embodiments, when a raw or legacy device 170 is added to a VLV, a "fake" DSP-like partition is created on the MIC 112. Then, any time a VLV is seen by a NMS, it creates a "slice" and adds it to the storage resource pool 140.

Figure 2:
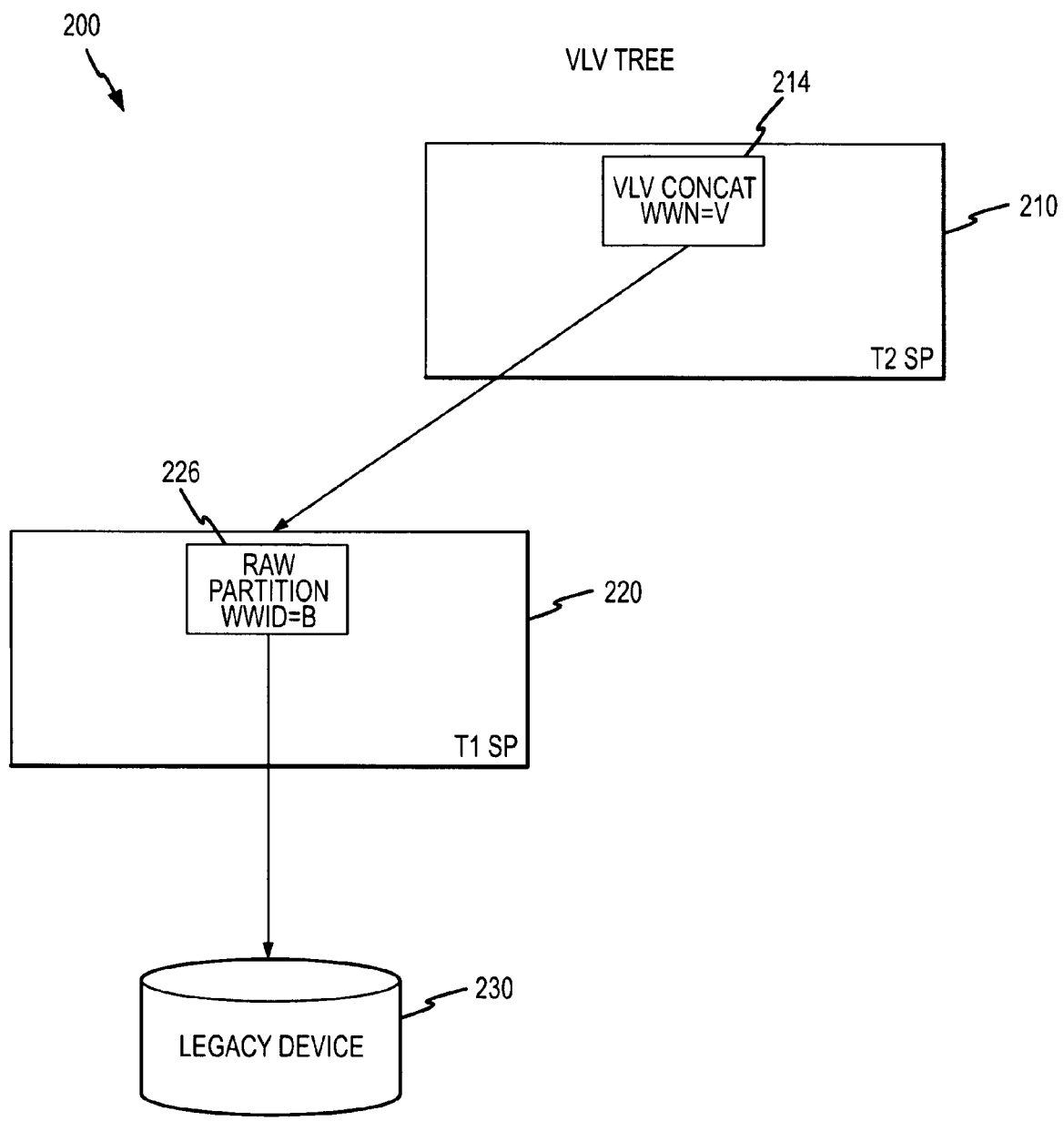
FIG. 2 illustrates a volume tree for a virtualized legacy volume (VLV) created for a legacy storage device.
Figure 3:
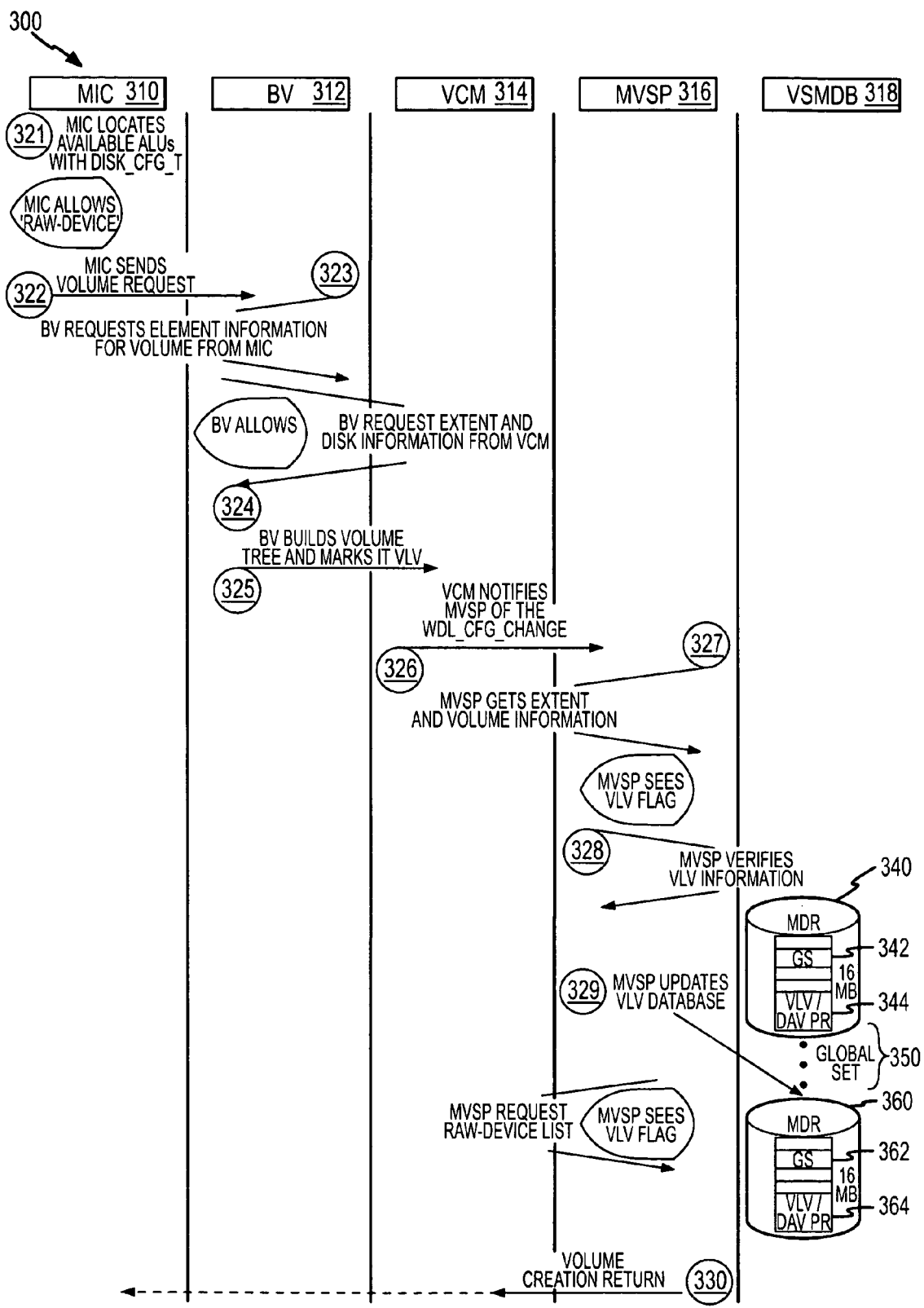
FIG. 3 illustrates exemplary steps in a process for forming a VLV, such as that shown in FIG. 2, according to the invention.

FIGS. 2 and 3 illustrate the creation of a simple virtualized legacy volume (VLV). FIG. 2 illustrates a volume tree 200 of a VLV and shows a VLV being created with a single legacy device 230. A first storage processor (SP) 210, such as one provided as a data services platform, is shown to contain a concatenated VLV 214 that is created from a legacy device 230 that is presented by a host or second SP 220 which initially presents the legacy device 230 to the SP 210 as a raw partition or raw device 226. The mapping of the VLV 214 to the host SP 220 should typically not require any significant modification as the VLV 214 acts like any other single partition concatenated volume.

FIG. 3 illustrates at a high level a method 300 of creating a VLV, such as the VLV 214 of FIG. 2 and such as by operation of the storage system 100 of FIG. 1. As shown, the actions of the method 300 are carried out by portions of a data services platform including a management interface or MIC 310, a block virtualization manager or BV 312, a virtualization configuration manager or VCM 314, a master virtualization storage processor or MVSP 316, and a volume state manager database or VSMDB 318 (typically in conjunction with operation of a volume state manager (VSM) 124 as shown in FIG. 1). At step 321, the MIC 310 locates available ALUs (e.g., all captive and legacy storage devices 150, 170). During 321, the MIC 310 may execute a storage scan that locates all the available storage devices linked to its data services platform or DSP (such as DSP 110 of FIG. 1). In this case, the legacy device(s) show up as an "unitialized" storage device or disk with no slices.

At 322, the MIC 310 allows the legacy device to be used as the only element of the new VLV and sets the VLV flag in the volume structure to indicate the new volume is a VLV. Further at 322, the MIC 310 issues a volume request to the BV 312. At 323, the BV requests volume element (e.g., ALU) information from the MIC 310 for the legacy device. Then, at 324, the BV 312 uses the ALU information for the legacy device to request extent and disk information from the VCM 314. The method 300 continues at 325 with the BV building the volume tree (see FIG. 2) using the legacy device (such as legacy device 170 or 230), e.g., slice is set at −1, and forwards the tree to the VCM 325. Again, the volume or volume tree is marked as a VLV.

At 326, the VCM 314 notifies the MVSP 316 of a volume configuration change. The method 300 continues at 327 with the MVSP 316 receiving the request from the VCM 314, and in response, the MVSP 316 requests from the VCM 314 a list of extents associated with the new volume (i.e., the new VLV). The MVSP 316 also requests from the VCM 314 volume information for the new VLV. At 328, the MVSP 316 validates the received extent information and also, verifies that the VLV objects being created do not already exist. This may be accomplished via queries to the VSMDB 318.

If these validations are successful, the MVSP 316 at 329 creates and writes the VLV database objects to the VSMDB 318. For example, the MVSP 316 may check in-memory (e.g., "alu_arr") to validate the legacy device. The MVSP may also request a raw or legacy device list from the VSMDB 318 and see VLV flags. As shown, the VSMDB 318 creates or manages a global set 350 of captive storage devices (or captive or DSP-owned ALUs) that have a reserved configuration metadata region (MDR) 340, 360 and within each of these MDRs 340, 360 a global set (GS) 342, 362 is stored including device configuration information, such as volume information and the like, for each device in the storage pool. This global set of information 342, 362 is useful for providing data services such as virtualization, and significantly, is shown to include VLV data 344, 364 that is created as part of the VLV generation process 300. In other words, the global set of information 342, 362 stores configuration and state information persistently. At 330, the MVSP 316 sends the volume tree and creation response to the VCM 314. After successful completion of the VLV generation 300, a "show volume" request or instruction may result in a volume name (such as vol/vlv and/or disk/4/3/2/0 or the like), a volume type (such as SAN or the like and/or concatenated), a volume size (such as a listing of the available storage space), a volume state (such as free, online, and the like), and a condition of the VLV (such as "intact" or the like).

Figure 4:
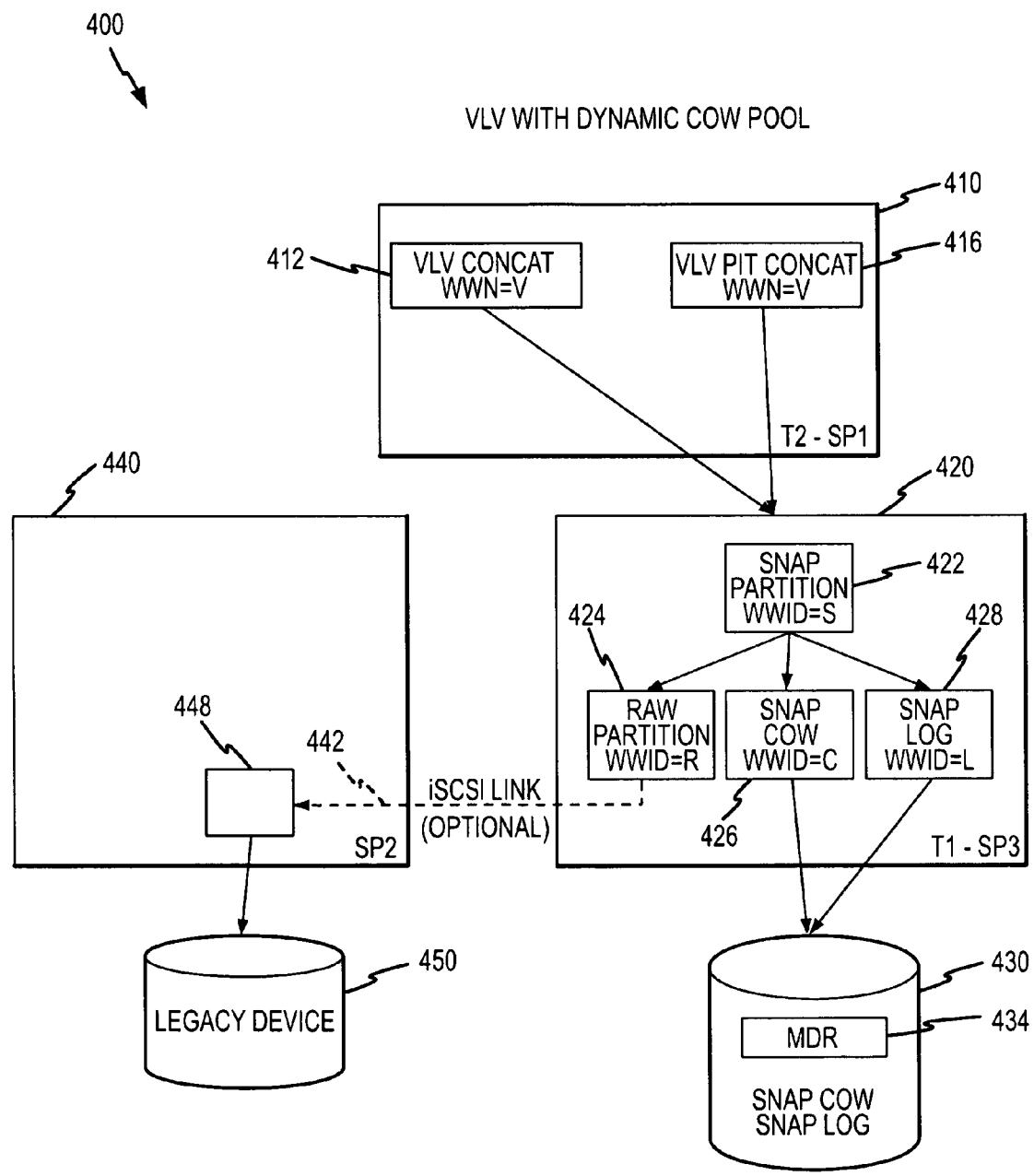
FIG. 4 illustrates a volume tree for a VLV with a dynamic COW pool formed according to one embodiment of the invention.
Figure 5:
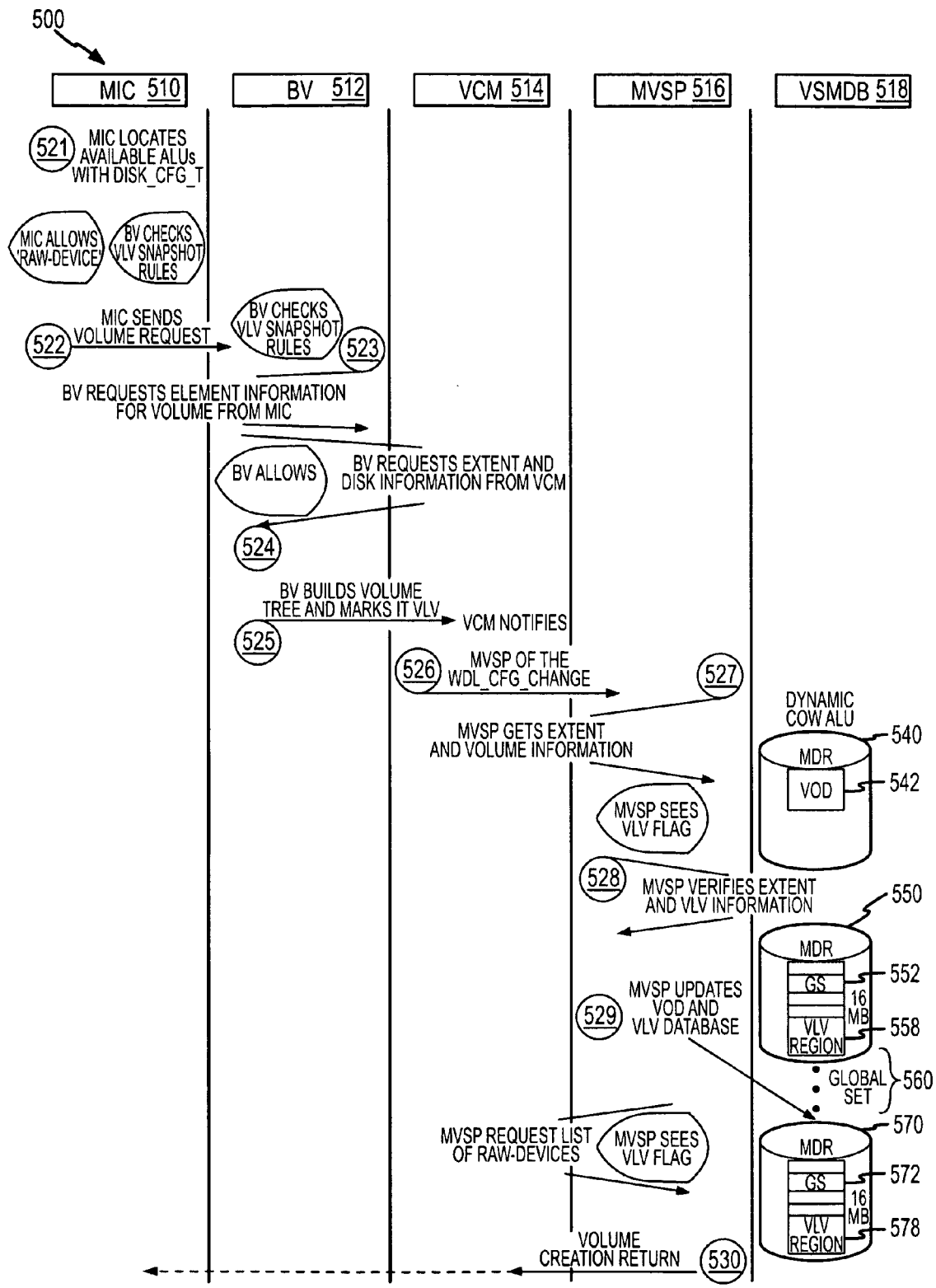
FIG. 5 shows a process for creating the VLV shown in FIG. 4 with the dynamic COW pool being provided on a storage device in the storage resource pool of the data storage system other than the legacy storage device corresponding to the VLV.

FIGS. 4 and 5 illustrate the creation of a VLV with a legacy device with the snapshot data services feature. FIG. 4 illustrates a volume tree 400 for a VLV with a dynamic COW pool, and FIG. 5 illustrates a method 500 for creating such a VLV. In one embodiment, a legacy device 450 (such as a 17.09 GB legacy device or the like) is made accessible via a host storage processor 440, and the VLV and dynamic COW pool created based on the legacy device 450 are the size of the legacy device 450. The volume tree 400 is shown to include a storage process (SP) or DSP 410 with a concatenated volume or VLV 412 along with a point in time image (PIT) or snapshot volume or VLV 416. These volumes are made available via a snapshot SRC 420 that includes a snap partition 422 mapped to a raw partition 424, a snapshot COW 426, and a snapshot log 428. The snapshot COW 426 and snapshot log 428 are mapped to a dynamic COW ALU 430 with a MDR 434 but in some cases the COW 426 and log 428 may be separate ALUs. A communication link (e.g., an iSCSI link) 442 is provided to the logic/processor hardware 448 of the host SP 440 that is providing the legacy device 450 to the storage pool controlled by SP 410. Note, the dynamic COW pool 430 is not provided on the legacy device 450, which prevents alteration or damage of existing legacy or user data, and in some cases the legacy device 450 may also be connected to the snapshot SRC 420.

FIG. 5 illustrate creation 500 of a VLV with snapshot. The components of a DSP responsible for performing the creation method 500 are shown and include a MIC 510, a BV 512, a VCM 514, a MVSP 516, and a VSMDB 518. At step 521, the MIC executes a storage scan that locates all the available storage devices linked to the DSP (such as devices 150, 170 linked via link 130 to DSP 110 as shown in FIG. 1). For example, a legacy device (such as device 170 or 450) shows up in the storage scan as an "uninitialized" disk or device with no slices. At 522, the MIC allows the located legacy device to be used as the first element of the VLV and sets the VLV flag in the volume structure. Since this volume is a VLV, the MIC verifies that there is space for the desired dynamic COW pool on a different ALU, i.e., on a captive or DSP owned storage device. Also, at 522, the MIC issues a volume request to the BV 512.

The method 500 continues at 523 with the BV 512 requesting or getting element information regarding the legacy device and additional/different ALU for the volume from the MIC 510. The BV 512 checks applicable snapshot rules and validates that the elements conform to snapshot rules for VLV. At 524, the BV 512 requests extent and disk information for the applicable ALUs from the VCM 514, and then, at 525, the BV 512 validates the legacy device and additional/different storage device or captive ALU. The BV 512 then builds the volume tree (see tree 400 of FIG. 4) using the legacy device (see device 450 or device 170) and the ALU selected to be the dynamic COW ALU. The BV 512 then forwards the volume tree, which is marked as VLV tree, to the VCM 514.

The VCM 514 responds by forwarding the request to the MVSP 516 at 526. The method 500 continues at 527 with the MVSP 516 getting extent and volume information from the VCM 514. At 528, the MVSP 516 verifies the extent and partition information such as with comparison with volume object data (VOD) 540 in the MDR 540 of the dynamic COW or snapshot ALU. At 529, the MVSP 516 interacts with the VSMDB 518 to update the VOD 542 on the snapshot ALU (see ALU 430 of FIG. 4 or one of the resources 150 in FIG. 1) with the COW and log partitions. The MVSP 516 also creates and writes VLV objects to the VLV database, e.g., VSMDB 518 or a portion of VSMDB 518. Again, a global set of ALUs (or captive resources such as resources 150 in the storage pool) 560 are updated such that their reserved metadata regions 550, 570 include a global set of data 552, 572 that shows the updated VLV region 558, 578 showing the creation of the VLV for the particular legacy device (such as device 450 or 170). As part of 529, the MVSP 516 requests raw or legacy device information from the VCM 514 and then, builds the volume tree, with a VLV tag. At 530, the MVSP 516 returns the volume tree and creation status to the VCM 514.

Figure 6:
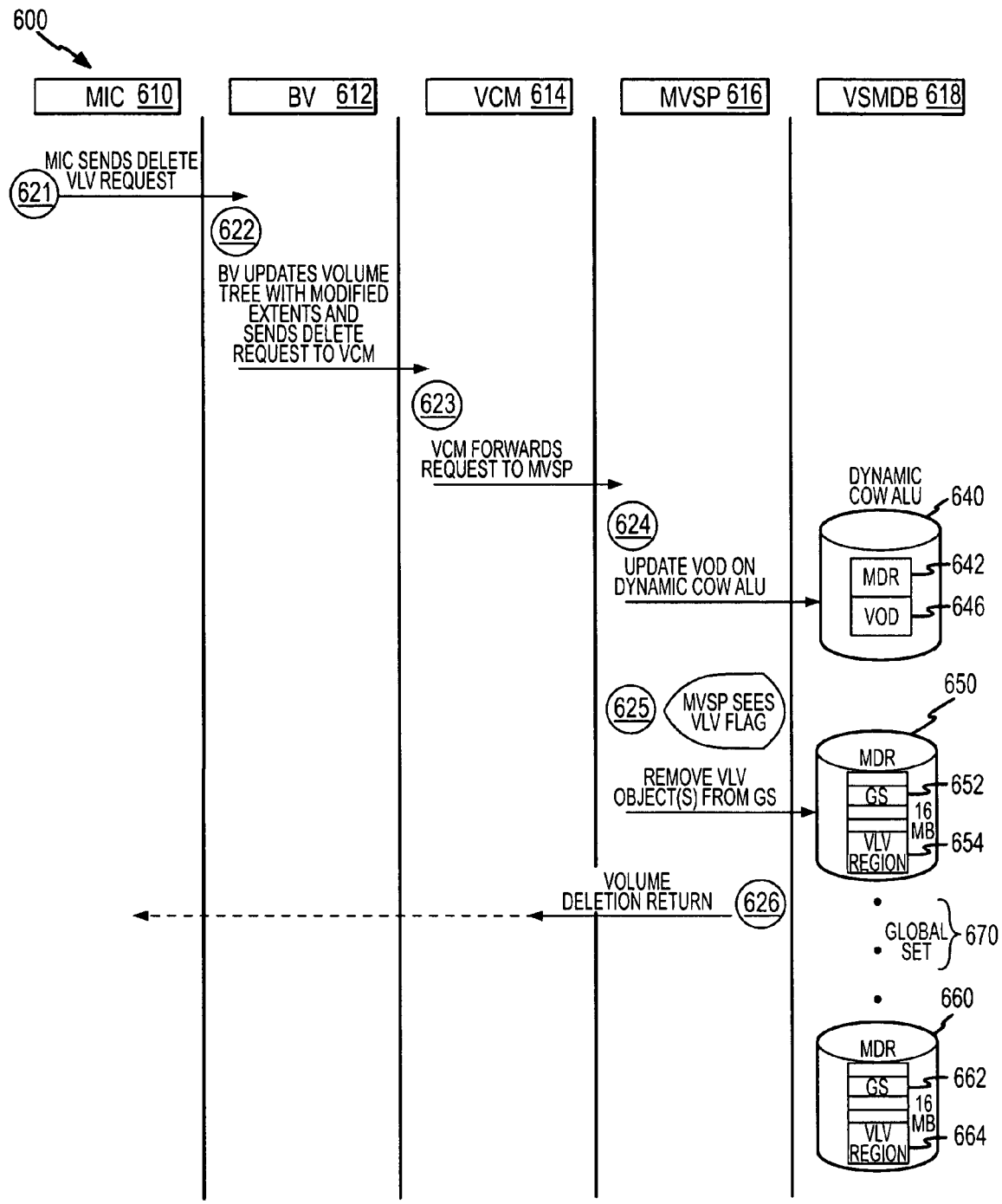
FIG. 6 illustrates steps and the responsible components of data services platform for deleting a VLV, such as the VLVs shown in FIGS. 2 and 4.

FIG. 6 illustrates how a DSP, such as DSP 110 of FIG. 1, may operate to delete a VLV and particularly, a VLV with an associated dynamic COW pool from a storage resource pool. The VLV deletion method 600 is shown again to be performed by a MIC 610, a BV 612, a VCM 614, a MVSP 616, and a VSMDB 618 of a DSP (not shown in FIG. 6 but see platform 110 of FIG. 1). At 621, the MIC 610 sends a volume delete request to the BV 612. The BV 612 at step 622 at to get extent information from the VCM 614. The BV 612 then updates extent information and passes the updated volume information (e.g., updated volume tree) and updated extents to the VCM 614 along with the delete request. At 623, the VCM 614 forwards the delete request to the MVSP 616.

At 624, with interaction with the VSMDB 618, the MVSP 616 locates associated ALU information and updates the VOD 646 (or dynamic COW pool VOD) in the MDR 642 of the snapshot ALU 640. At 625. Again, the storage pool includes a global set of ALUs that each have a set aside configuration metadata region (MDR) 650, 660 with a global set of data used for data services 652, 662 including a VLV region 654, 664, as the information for use in providing data services by the DSP is not placed on the legacy device corresponding to the VLV. At step 625, the MVSP 616 removes VLV object(s) affected by the VLV delete request from the VLV region 654, 664 of the global set 652, 662 of the MDRs 650, 660 in the global set of ALUs 670. At 626, the MVSP 616 returns the volume deleted status to the VCM 614.

Figure 7:
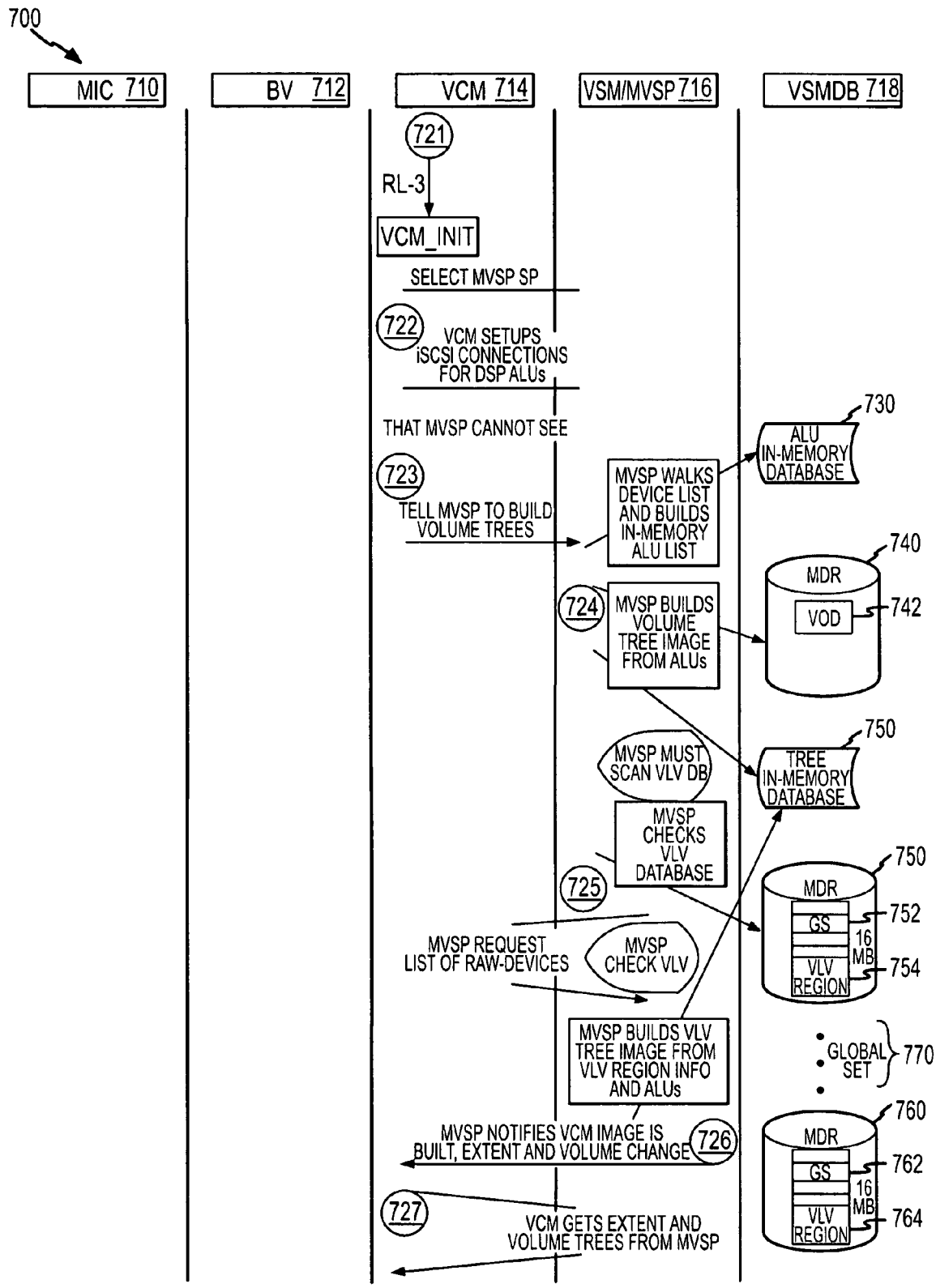
FIG. 7 illustrates an embodiment of a process for restoring a previously created VLV.

FIG. 7 illustrates a VLV restoration process 700 performed by a data services platform (DSP), such as DSP 110 of FIG. 1, when the DSP is booted and a VLV was previously created in the storage system or storage resource pool. Again, the DSP includes an MIC 710, a BV 712, a VCM 714, a VSM and MVSP 716, and VSMDB 718 to perform various functions during the VLV restoration 700. At step 721, when the DSP is booted, the VCM 714 is initialized (e.g., at run level 3 on the NINE). At 722, the VCM 714 selects a MVSP 716, and sets up connections (e.g., iSCSI connections) to any DSP-owned or captive resources or ALUs that the MVSP 716 cannot see in the resource pool. At 723, the VCM 714 builds a list of all the captive ALUs in the storage pool (e.g., on the chassis or the like) and sends the ALU list to the VSM/MVSP 716 along with a request to build volume trees.

The method 700 continues at 724 with the MVSP 716 receiving the device list and then, walking the list to build an in-memory ALU list or database 730. At 725, the MVSP 716 builds the volume trees 750 from this list which is stored in a device in the metadata region 740 as VOD 742, and then, updates the in-memory tree database 750 via VSMDB 718. At 725, the MVSP 716 checks the VLV database for VLV information by inspecting the VLV region 754, 764 of the global set or region of data 752, 762 in the MDRs 750, 750 of the global set of captive or DSP-owned storage resources 770. The MVSP 716 sees that one or more VLV exist in the storage pool and, in response, the MVSP 716 requests a list of raw devices from the VCM 714. Using the VLV regions 754, 764 of the MDRs 750, 760 and applicable ALUs, the MVSP 716 builds the VLV volume tree(s). At 726, the MVSP notifies the VCM 714 that the image is built and that there are extent and volume changes. At 727, the VCM 714 queries the MVSP 716 for extent and volume information builds it own copy of the volume trees.

Figure 8:
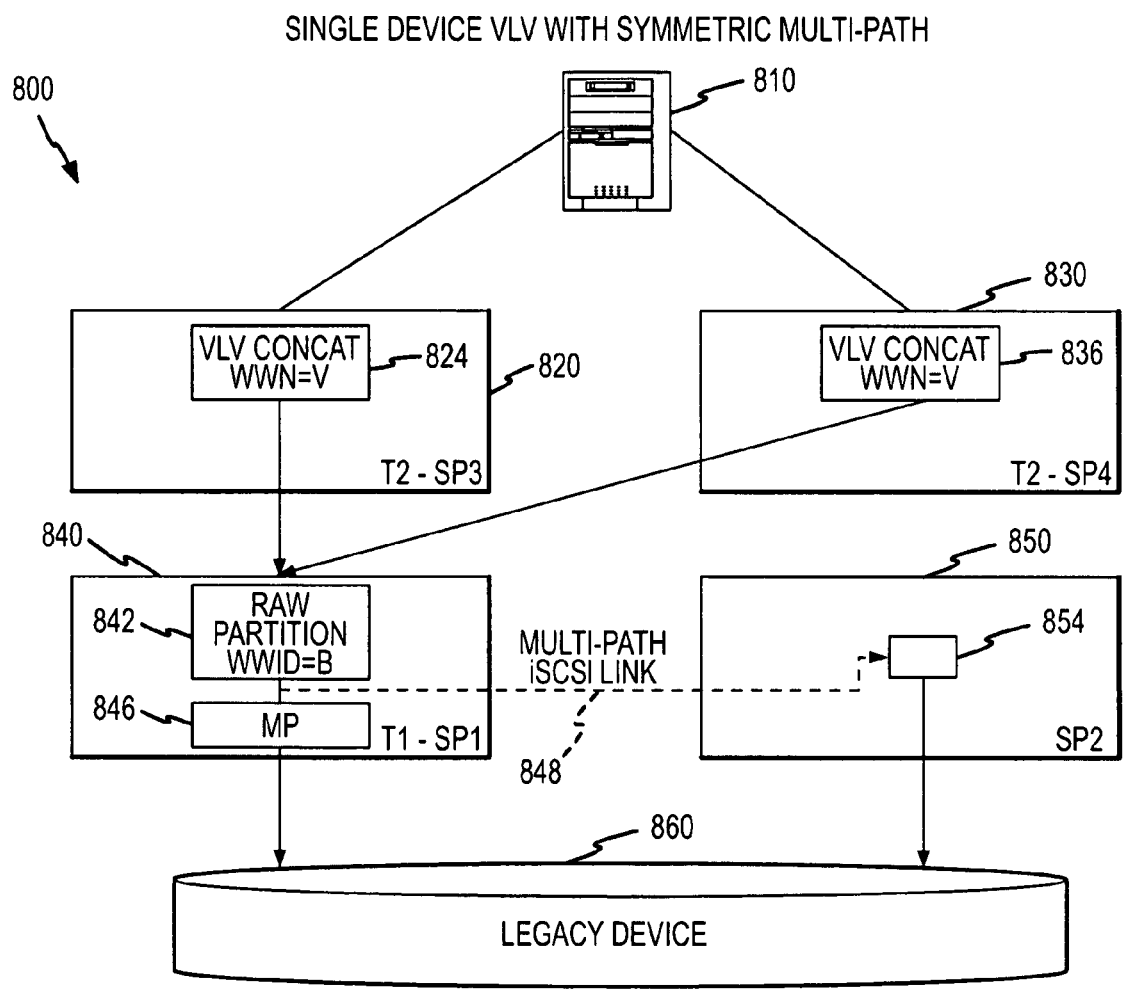
FIG. 8 shows a representative single device VLV with a symmetric multi-path according to the invention.

In preferred embodiments of the invention, VLVs are configured to support multi-path features as the case with other volumes formed for a DSP-owned or captive storage resource or device. These multi-path features include symmetric access from multiple host ports among other features. FIG. 8 illustrates a multi-path volume tree for a single device VLV (e.g., a VLV formed based on legacy device 860) that is mapped to a host 810 with multi-path support. The VCM in the DSP configures the proper connections, e.g., multi-path iSCSI link 848. As shown, the two paths are provided to the legacy device 860 to storage processors 840, 850 with link 848 connecting logic/hardware 854 of storage processor 850 with MP 846 of storage processor 840. Symmetry is provided in the system 800 as host 810 can access the virtualized legacy volume provided by legacy device 860 via concatenated VLVs 824, 836 provided by storage processors 820, 830, which each are mapped to the raw partition 842 maintained by storage processor 840.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for providing data services such as virtualization to legacy storage devices, comprising:
    reserving a metadata region in memory of each storage resource that is provided in a storage pool and that is controlled by a data services platform, the metadata region including a global set of data containing information used by the data services platform to manage the data services including virtualization of volumes throughout the storage pool;
    locating a legacy storage device available for inclusion in the storage pool;
    retrieving element information for the legacy storage device;
    building a virtualized legacy volume based on the element information; and
    updating the global set of data in the metadata region to include information on the virtualized legacy volume built using the legacy storage device element information wherein the legacy storage device comprises memory storing legacy data and wherein the legacy data is unchanged by completion of the reserving, the locating, the retrieving, the building, and the updating.

2. The method of claim 1, wherein the element information includes extent and disk information for the legacy storage device.

3. The method of claim 1, wherein the building of the volume for the legacy storage device comprises building a volume tree and marking the volume tree as the virtualized legacy volume.

4. The method of claim 1, further comprising providing a snapshot storage resource for the built volume including updating a metadata region of the snapshot storage resource based on the volume information for the legacy storage device.

5. The method of claim 1, further comprising providing a symmetric multi-path to the legacy storage device using the built volume.

6. The method of claim 1, further comprising rebooting the data services platform after the updating of the global set of data, the rebooting including building a volume tree image for each storage resource in the storage pool including the legacy storage device for which the volume tree image is built from the volume information for the legacy storage device stored in the global set of data in the metadata region of the memory in the data services platform-controlled storage resource.

7. A data storage system adapted for providing virtualization services to captive and legacy storage devices without destroying stored legacy data, comprising:
    a storage controller;
    a plurality of storage resources linked to the storage controller and captive to the storage controller, each of the captive storage resources comprising memory with a configuration metadata region storing data specific to the particular storage resource that is used by the storage controller to provide the virtualization services to the particular storage resource;
    a legacy storage device storing a set of legacy data; and
    a subset of the storage resources storing a global set of data used by the storage controller in providing the virtualization services to the storage resources, wherein the global set of data further comprises volume data for a virtualized volume for the legacy storage device used by the storage controller in providing the virtualization services to the legacy storage device.

8. The system of claim 7, wherein the legacy storage device is a disk device and wherein the volume data for the legacy storage device comprises extent and disk information.

9. The system of claim 8, wherein one of storage resources is configured and maintained as a snapshot of the virtualized volume of the legacy storage device.

10. The system of claim 7, further comprising a database storing volume trees for the plurality of storage resources and for the legacy storage device.

11. A virtualization method for use in providing virtualization services to legacy storage devices made available in a storage resource pool, comprising:
    locating attached logical units in a data storage pool controlled by a storage controller, wherein the located attached logical units comprise a legacy storage device;

generating a request to build a volume for the legacy storage device;

retrieving element information for the legacy storage device;

building a volume tree for the legacy storage device based on the element information; and based on the volume tree, storing virtualized legacy volume data for the legacy storage device in a metadata region on one of the located attached logical units other than the legacy storage device.

12. The method of claim 11, wherein the element information comprises extent and volume information for the legacy storage device.

13. The method of claim 11, further comprising storing the virtualized legacy volume data in a metadata region on a second one of the located attached logical units.

14. The method of claim 11, further comprising designating one of the located attached logical units as a snapshot device for the built volume including updating a metadata region of the snapshot device based on the volume information for the legacy storage device.

15. The method of claim 11, further comprising providing a symmetric multi-path to the legacy storage device using the virtualized legacy volume.

16. The method of claim 11, further comprising rebooting the storage controller after the storing of the virtualized legacy volume, the rebooting including building a volume tree image for each attached logical unit in the storage pool including the legacy storage device for which the volume tree image is built from the virtualized legacy volume data.

17. The method of claim 11, wherein the attached logical units other than the legacy storage device are captive to the storage controller.

* * * * *